United States Patent [19]
Yamagishi

[11] 3,800,992
[45] Apr. 2, 1974

[54] APPARATUS FOR FEEDING ELONGATED DOCUMENT TO ELECTRO-PHOTOGRAPHIC COPIER

[75] Inventor: Seiichi Yamagishi, Tokyo, Japan

[73] Assignee: Minolta Camera Kabushiki Kaisha, Higashiku, Osaka, Japan

[22] Filed: June 27, 1973

[21] Appl. No.: 374,168

[52] U.S. Cl............ 226/11, 226/35, 226/74, 226/108, 226/134, 226/176, 226/181
[51] Int. Cl............................................. B65h 25/00
[58] Field of Search ....... 226/74, 75, 108, 112, 181, 226/195, 11, 35, 134, 176

[56] References Cited
UNITED STATES PATENTS
| | | | |
|---|---|---|---|
| 3,734,617 | 5/1973 | Kitch | 226/11 X |
| 3,179,045 | 4/1965 | Evers | 226/108 X |
| 3,407,981 | 10/1968 | Staugaard | 226/74 X |

Primary Examiner—Allen N. Knowles
Assistant Examiner—Gene A. Church
Attorney, Agent, or Firm—Wolder & Gross

[57] ABSTRACT

An apparatus comprising a document guide portion for receiving the document face up while permitting the operator to read the document therethrough, first drive means for forcibly driving the document received therein, a document reversing guide formed with a document passage by which the document driven by the drive means is turned face down at one end of the document table, second drive means disposed at the outlet of the document passage and including driven rollers rollingly engageable with the document under the torque thereof due to gravity to drive the document onto a document table glass at a higher circumferential speed than the first drive means, third drive means rollingly engageable with the document under gravity and to be driven at a higher circumferential speed than the second drive means, and fourth drive means disposed at the terminal end of the document table glass and including driven rollers rollingly engageable with the document under gravity, the fourth drive means being drivable at a higher circumferential speed than the third drive means only in the normal direction and idly rotatable in the reverse direction. With timing controlled by an electromagnetic mechanism, the driven rollers of the second drive means and the third drive means are rollingly engageable with elements to be thereby engaged. Thus they come into rolling contact with the elements under gravity when the document has reached the interior of the document reversing guide and are supported at positions away from the document upon the document reaching the fourth drive means.

3 Claims, 4 Drawing Figures

APPARATUS FOR FEEDING ELONGATED DOCUMENT TO ELECTRO-PHOTOGRAPHIC COPIER

BACKGROUND OF THE INVENTION

This invention relates to apparatuses for feeding elongated documents, more particularly to an apparatus for feeding an elongated document for an electrophotographic copier or the like which is suitable to use when copies are made from an elongated original document, such as output document of computer, recording a number of pages in the form of one elongated continuous sheet.

Electrophotographic copiers have the construction that the surface of a document is illuminated with an iodine lamp or the like to expose the photosensitive element to the reflected light for a copying operation, so that generally the document placed face down on the document table glass is illuminated by the illuminating unit in the machine. Accordingly, in the case of an elongated document such as the above-mentioned output document, it is very troublesome to find the desired page to be copied if the entire surface of the document is placed face down.

Although such trouble will be eliminated if the document is adapted to be reversed on the document table when it is fed to the copier, it requires a cumbersome procedure to place the first page of the document on the document table. Moreover, if the path of transport should be clogged with paper at this time, the document itself will be seriously damaged especially in the case of an output original document of computer or the like. Furthermore, the document must be kept planar properly on the document table.

SUMMARY OF THE INVENTION

An object of this invention is to provide an apparatus for feeding an elongated document as described above in which the document is automatically reversed on the document table during transport so that document will be transported face up just until the document face is illuminated by the illuminating unit in the copier, permitting the operator to find the page to be copied with ease.

Another object of this invention is to provide an apparatus by which the first page of an elongated document, namely the leader end thereof, can be fed to the copier automatically free of clogging.

Another object of this invention is to provide an apparatus which is free of clogging with paper during transport and which is capable of keeping the document planar at the position where the document is illuminated.

According to this invention, there is provided an apparatus comprising a document guide portion for receiving an elongated document face up while permitting the operator to read the record on the document from above, first drive means for driving the document received in the guide portion, a document reversing guide forming a curved document passage on one end of the document table for turning the document face down, second drive means disposed at a lower end outlet of the document passage and including second drive rollers to be driven at a higher circumferential speed than the first drive means in the same direction and second driven rollers rollingly engageable with the second drive rollers under the torque thereof due to gravity to nip the document therebetween and to forcibly send out the document from the document passage onto a document table glass, third drive means rollingly engageable with the document travelling on the document table glass under the torque thereof due to gravity and to be driven at a higher circumferential speed than the second drive rollers in the same direction, and fourth drive means disposed at the terminal end of the document table glass and including fourth drive rollers to be driven by way of a one-way clutch at a higher circumferential speed than the third drive means only in the normal direction and idly rotatable in the reverse direction and fourth driven rollers rollingly engageable with the fourth drive rollers under gravity to nip the document therebetween. The first, second and third drive means can all be driven in the normal and reverse directions. The second driven rollers and the third drive means which are rollingly engageable with the document under the torque due to the gravity acting on the rollers are controlled by an electromagnetic mechanism with respect to the timing that they come into rolling engagement with the document. Thus they are in rolling contact with the document only after the leader end of the document has been placed into the document reversing guide and until it reaches the fourth drive means and are thereafter kept away from the document.

The elongated document inserted into the apparatus with its leader end placed along the document guide portion is engaged face down by the first drive means and driven into the document reversing guide. Before the document is led into the document reversing guide, the operator can read the record on the document from above as desired and with ease, so that the desired portion to be copied can be found without any difficulty. The desired copy will then be made by lighting the illuminating unit provided beneath the document table glass after the document is stopped at the desired position or while it is being driven.

The respective drive means for driving the elongated document are so constructed that the rotational speed thereof is increasingly higher from means to means. On the other hand, the second driven rollers and the third drive means are in rolling contact, under the torque of the rollers due to the gravity, with the document only during the period after the document has been led into the document reversing guide until it reaches the fourth drive means and are otherwise out of contact with the document. Further inasmuch as the fourth driven rollers of the fourth drive means are rollingly engageable with the document under gravity, the respective drive means are allowed to slip to some extent relative to the travelling document, this making it possible to cause the slippage to compensate for the differences in the speeds of rotation and at the same time to subject the document to a proper tension all the time.

Accordingly, the feeding apparatus does not slacken the document during transport, is free of clogging with paper from the start of transport until the termination thereof and keeps the document planar on the document table.

During transport of the document in the reverse direction, the fourth drive means is driven idly to subject the document to a rotational resistance. Since the second driven rollers and the third drive means are then out of contact with the document, slipping occurs between the second drive rollers and the document, with the result that the first drive means alone acts to transport the document in the reverse direction, while the fourth drive means exert the rotational resistance. Thus there is no possibility of the document slackening as in the transport in the normal direction.

Other objects and features of this invention will become more apparent from the following description of embodiment of the invention.

DESCRIPTION OF THE PREFERRED EMBODIMENT

Figure 1:
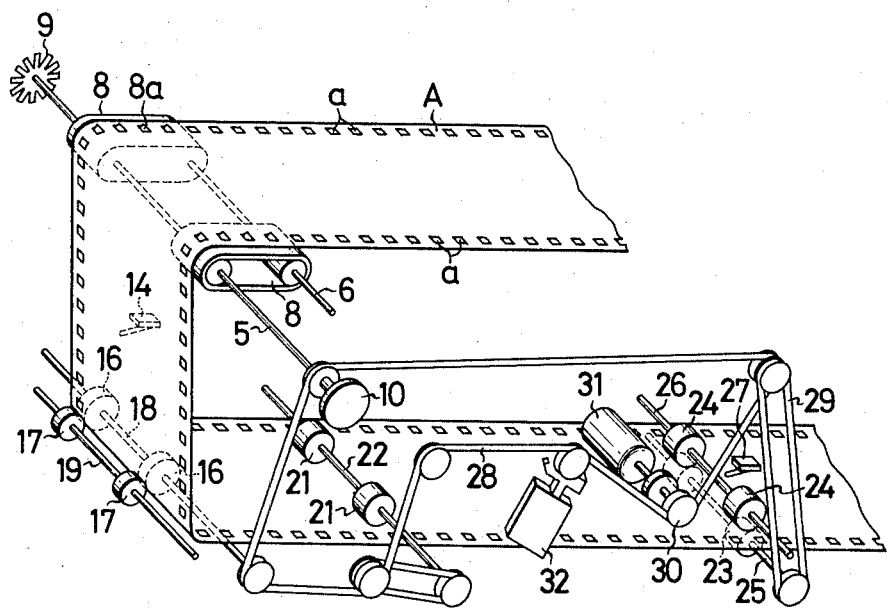
FIG. 1 is a perspective view schematically showing the construction of principal part of an embodiment of this invention.

With reference to an embodiment shown in the drawings, there is shown a frame B having a pair of front and rear side plates 1 and 2 and adapted to be placed on the document table of a copier (not shown). Disposed at the top of the frame B and hingedly supported by a rod 3 is a document guide plate 4 made of an acrylic resin transparent plate or a wire net-like material and so adapted that the record on the document surface can be seen through from the above. The guide plate 4 permits the leader end of the document to be inserted face down into the apparatus.

At the left of the guide plate 4 there are a feed belt drive shaft 5 and a paper width adjusting shaft 6 supported by and extending between the side plates 1 and 2. Two feed belts 8 supported on the shafts 5 and 6 are movable in the direction of their axes (i.e., in the direction of width of the document) and are driven by the drive shaft 5. The positions of the feed belts 8 are determined by lock levers 7 on the shaft 6 in conformity with the width of the document A. Although the mechanism for determining the positions of the feed belts 8 by the lock levers 7 is not shown, it may be a usual locking mechanism generally employed. Projections 8a are provided on the feed belt 8 at a equal spacing to the perforations a of the document A. The projections 8a engage in the perforations of the document fed in along the guide plate 4 for the transport of the document. Thus first drive means comprises the shafts 5 and 6 and feed belts 8 supported thereon.

As seen in FIG. 1, the drive shaft 5 further carries at its one end a member 9 for counting the amount of transport of the document. Although unillustrated, the member 9 operates a suitable counter. The drive shaft 5 carries at the other end an electromagnetic brake 10 for stopping the document A accurately at the desired position.

After the elongated document A such as an output original or the like which has been inserted face up along the guide plate 4 with its leader end exposed from the left side of the guide plate 4, the perforations a at the end are engaged by the projections 8a of the feed belts 8. Closing of an unillustrated feed switch forces the document into the space between document reversing guide plates 11 and 12 disposed at the left end of the apparatus while the amount of transport is being counted. The document reversing guide plates 11 and 12 define therebetween a C-shaped curved passage 13 for the document, from the lower end of which the document is sent out face down.

The foregoing mechanism for forcibly transporting the document, namely first drive means, by which the document is transported by virtue of the engagement of the projections 8a in the perforations a may alternatively be replaced by a mechanism including upper and lower rollers or belts for forcibly transporting the document A in nipping engagement therewith or by a mechanism including these means in combination.

A driven member of a first microswitch 14 or like switch means projects, at a suitable position, into the document passage 13 formed by the guide plates 11 and 12. The leader end of the document A advancing along the passage 13 kicks the driven member and closes the switch 14. The switch 14 is included in the electric circuit (not shown) of a solenoid 15 so as to serve as an actuator switch for an electromagnetic mechanism to be described later.

Disposed at the lower end of the document passage 13 are second drive rollers 16 and second driven rollers 17 which come into rolling contact with the rollers 16 under their torque due to gravity. The timing of the rolling contact is controlling by the solenoid 15. The rollers 16 and 17 are mounted on a second drive shaft 18 and a second driven shaft 19 respectively, the driven shaft 19 being supported by one member of the electromagnetic mechanism to be described later. The second drive rollers 16 are driven by the drive shaft 18 at such speed that the circumferential speed thereof is suitably faster than the circumferential speed of the feed belts 8. The energization of the solenoid 15 by the closing of the switch 14 brings the second driven rollers 17 into rolling contact with the second drive rollers 16, causing the rollers 16 and 17 to nip the document A which has reached the lower end of the document passage 13 and to send out the same onto the surface of a document table glass 20 (see FIGS. 3 and 4). Although the second drive rollers 16 tend to send out the document A at a higher circumferential speed than the feed belts 8, the second driven rollers 17 are in rolling contact with the document A under the torque of the rollers due to gravity, permitting slippage to take place between the second drive rollers 16 and the document A due to the difference between the circumferential speeds. Consequently, tension acts on the document A between the feed belts 8 and the second driven rollers 16 to prevent the passage from being clogged with paper due to slackening. In this way, the second drive rollers 16, second driven rollers 17 and shafts 18 and 19 therefor constitute second drive means.

Disposed on the document table glass 20 at its approximate center are third rollers 21 adapted to come into rolling contact with the document A which is being sent forward on the surface of the document table glass 20. As is the case with the second driven rollers 17, the rolling contact is effected by the solenoid 15 under the torque of the rollers due to gravity when the solenoid is energized. The rollers 21 are mounted on a third drive shaft 22 supported on one member of the electromagnetic mechanism and is driven at a suitably higher circumferential speed than the second drive rollers 16. The document A sent out from the passage 13 is kept in contact with the surface of the document table glass 20 by the third drive rollers 21. By virtue of the slipping of the rollers 21 on the document A that takes place due to the difference between their circumferential speed and that of the feed belts 8, the rollers 21 exert tension on the document A to prevent the same from slackening to thereby preclude clogging while transporting the document A along the surface of the glass. The third drive rollers 21 and the drive shaft 22 constitute third drive means.

At the right end of the document table glass 20, there are fourth drive rollers 23 and fourth driven rollers 24 adapted for rolling contact with the rollers 23 under gravity. The fourth drive rollers 23 are mounted on a fourth drive shaft 25 extending between and supported on the side plates 1 and 2. Between the roller 23 and the shaft 25 or between the shaft 25 and drive means therefor, there is provided a one-way clutch (not shown) so that the fourth drive rollers 23 will be driven by the drive means only when the document A is transported in the normal direction but will rotate idly during transport in the reverse direction. When driven in the normal direction to transport the document in the normal direction, the rollers 23 rotate at a suitably higher circumferential speed of rotation than the third drive rollers 21. The fourth driven rollers 24 are mounted on a fourth driven shaft 26 supported by the side plates 1 and 2 in an upwardly and downwardly movable manner. The fourth drive rollers 23, fourth driven rollers 24 and drive means including the one-way clutch constitute fourth drive means.

The leader end of the document A sent forward on the document table glass by the third drive means reaches the fourth drive means and is nipped by the rollers 23 and 24 for further transport. At this time, the circumferential speed of rotation of the fourth drive means is higher than the circumferential speeds of the first, second and third means, so that the document A is subjected to tension. Inasmuch as the forth driven rollers 24 are merely in rolling contact with the document A under gravity, slippage occurs between the fourth drive roller 23 and the document A due to the difference in the speed. The above-mentioned tension therefore serves to prevent the document from slackening to eliminate clogging with paper.

At the outlet for the rollers 23 and 24, there is disposed a driven member of a second microswitch 27 or like switch for detecting that the leader end of the document A has reached the fourth drive means, the arrangement being such that the leader end of the document A kicks the driven member of the switch 27 to open the electric circuit for energizing the solenoid 15 to thereby deenergize the solenoid 15 which has been energized by the closing of the first microswitch 14.

The first microswitch 14 is a normally open contact switch and the second microswitch 27 is a normally closed contact switch. They are included in the energizing circuit for the solenoid 15 in series and the solenoid 15 is energized only while both the switches 14 and 27 are closed.

As illustrated in FIG. 1, the drive shafts 5, 18, 22 and 25 for the drive means are driven by a motor 31 at the predetermined peripheral speeds of rotation through belt transmission means 28, 29 and an electromagnetic clutch 30. Closing of an unillustrated feed switch engages the electromagnetic clutch 30 to rotate the respective drive shafts, while opening of the same causes the electromagnetic clutch 30 to interrupt the transmission of torque of the motor 31 to stop the rotation of the drive shafts. Electromagnetic brakes 10 and 32 operate when the drive means are brought to a halt to accurately stop the desired portion of the document on the document table.

Figure 2:
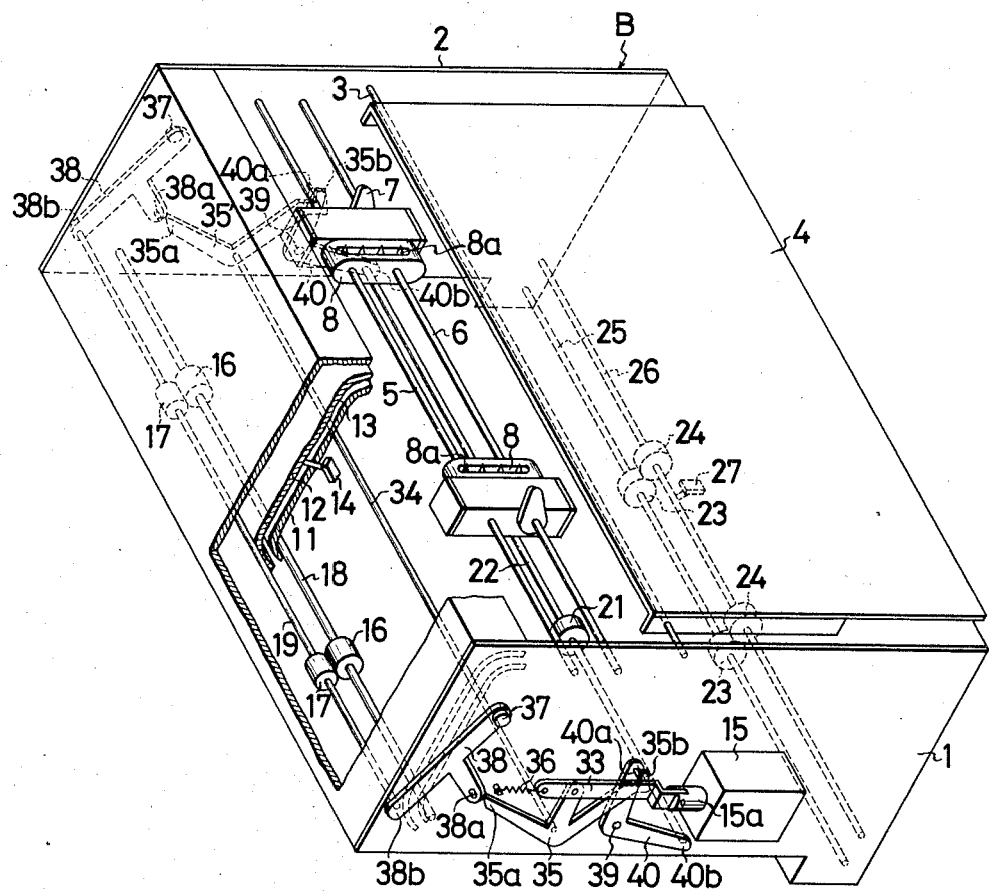
FIG. 2 is a perspective view with part broken away showing the overall construction of the embodiment of FIG. 1.
Figure 3:
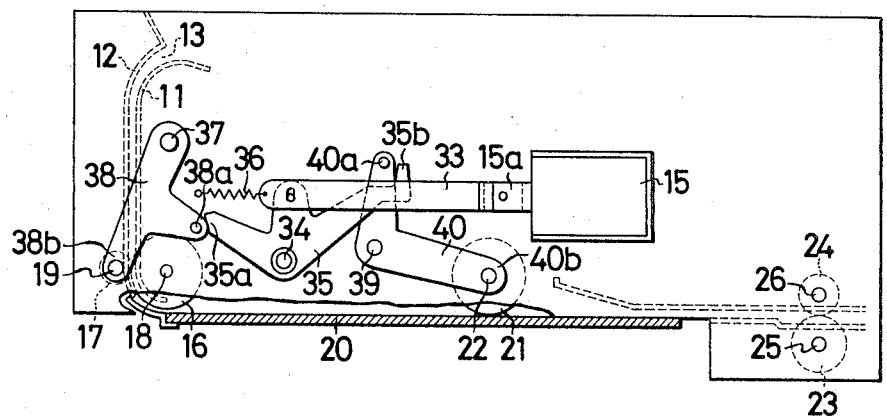
FIGS. 3 and 4 are front views showing the operation of electromagnetic mechanism for second and third drive means in the foregoing embodiment.
Figure 4:
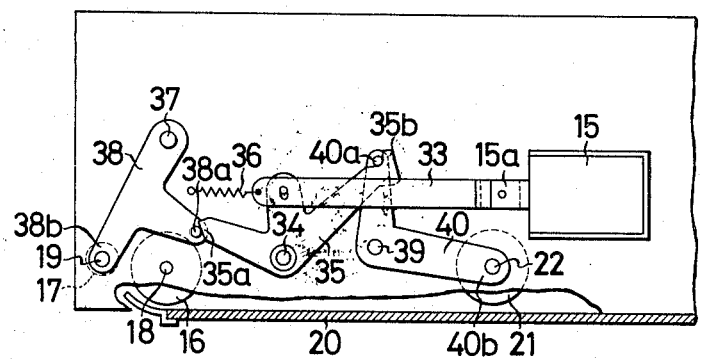

The electromagnetic mechanism including the solenoid 15 is shown in FIGS. 3 and 4 and partially in FIG. 2.

The solenoid 15 is connected, by means of a link 33 connected to its actuator 15a, to an actuating lever 35 on a rod 34 supported at their ends by the side plates 1 and 2 and is urged leftward by a spring 36 acting on the rod 33. The rod 34 further fixedly carries a coupling lever 35'. The actuating lever 35 and the coupling lever 35' are rotatable together by means of the rod 34.

The energization of the solenoid 15 upon closing of the first microswitch 14 forces the link 33 rightward against the spring 36 to turn the levers 35 and 35' in a clockwise direction. On the other hand, when the solenoid 15 is deenergized by the operation of the second microswitch 27, the spring 36 acts to move the link 33 leftward and turns the levers 35 and 35' in a counterclockwise direction.

The levers 35 and 35' each have first actuating arms 35a and second actuating arms 35b. While the solenoid 15 is in an unenergized state, the levers 35 and 35' are under the action of the spring 36 as seen in FIG. 4 to cause the first actuating arms 35a to push driven pins 38a clockwise which pins are provided on a pair of first driven levers 38 pivoted to pins 37 on the side plates 1 and 2 respectively. At the same time, the second actuating arms 25b push driven pins 40a counterclockwise which pins are provided on a pair of second driven levers 40 pivoted to pins 39 on the side plates 1 and 2 respectively. While the solenoid 15 is deenergized, these pins are released from the corresponding arms as seen in FIG. 3.

The arms 38b of the pair of first driven levers 38 support at their ends the ends of the second driven shaft 19 respectively. The driven pins 38a when pushed by the first actuating arms 35a move the levers 38 in a clockwise direction, releasing the second driven rollers 17 on the second driven shaft 19 from the second drive rollers 16. The two second driven levers 40 carry, at the ends of their arms 40b, the ends of the third drive shaft 22 respectively. When pushed by the second actuating arms 35b, the driven pins 40a rotate the levers 40 in a counterclockwise direction to move the third drive rollers 21 on the third drive shaft 22 upward from the surface of the document table glass 20.

The energization of the solenoid 15 turns the actuating lever 35 and coupling lever 35' in a clockwise direction, permitting the actuating arms 35a and 35b of the levers 35 and 35' to release the driven pins 38a and 40a, whereupon the first driven levers 38 rotate in a counterclockwise under the gravity acting on the assembly of the levers 38, shaft 19 and rollers 17. At the same time, the second driven levers 40 rotate in a clockwise direction under the gravity acting on the assembly of the levers 40, shaft 22 and rollers 21. Consequently, the second driven rollers 17 come into rolling contact with the second drive rollers 16, and the third drive roller 21 with the document table glass 20. In this state, the ends of the actuating arms 35a and 35b are away from the driven pins 38a and 40a with which they are engageable so as not to interfere with the motion of the driven levers 38 and 40. When the leader end of the document A reaches the fourth drive means and kicks the driven member of the second microswitch 27, the solenoid 15 will be deenergized and the second driven rollers 17 and the third drive rollers 21 are moved out of contact with the document as already described.

The electric circuit (not shown) for energizing the solenoid 15 is so constructed that the solenoid will not be energized during the transport of the document in the reverse direction. The description of the structure of the circuit will be omitted.

When the elongated document is placed into the apparatus along the guide plate 4 with its leader end set on the first drive means comprising the feed belts 8 or the like, the document will be transported very smoothly by closing of the unillustrated feed switch, while permitting the user to read the record on the document just until the document is sent onto the document table glass 20 face down. The slippage that takes place between the drive rollers of the second, third and fourth drive means and the document eliminates slackening of the document without imarting excess tension to the same.

The construction that the leader end of the document A interrupts the supply of energizing current to the solenoid to retract the third drive rollers 21 upward upon reaching the fourth drive means prevents the reproduction of the shadow of the rollers 21 on the copy especially when a thin document is copied.

When the document A is to be transported in the reverse direction, a switch is closed which emits an electric signal for sending the document in the reverse direction, whereby the motor 31 is driven in the reverse direction to drive the drive shafts in the reverse direction. The number of revolution of each of the drive shafts is so determined that the circumferential speed of the feed belts 8 is lower than the circumferential speeds of rotation of the other drive rollers, and especially the number of revolution of the fourth drive shaft 25 is so determined as to give the fourth drive rollers 23 higher circumferential speed of rotation than any other drive means. However, since a one-way clutch is interposed between the fourth drive roller 23 and the fourth drive shaft 25 or between the fourth drive shaft 25 and drive means therefor which clutch is adapted to be engaged to transmit the torque only when the rollers 23 to rotate idly during reverse rotation, the torque will not be delivered to the rollers 23 when they are driven in the reverse direction.

The second driven rollers 19 included in the second drive means and the third drive rollers 21 of the third drive means are held out of contact with the document during the above-mentioned reverse rotation, inasmuch as the solenoid 15 is so designed that it will not be energized during the reverse rotation.

Consequently, the document A is then driven only by the feed belts 8, i.e., by the first drive means and the fourth drive means, driven by the document A as it travels in the reverse direction, imparts its rotational resistance to the document A to tension the same against slackening and to thereby prevent clogging.

At this time, the circumferential speed of rotation of the second drive rollers 16 is slightly higher than the speed of reverse travel of the document A, but the rollers 16 will not exert a driving force on the document A which is subjected to the rotational resistance of the fourth drive means, because the second driven rollers 17 are out of contact with the document. Due to the speed difference, therefore, slippage occurs between the document A and the second drive rollers 16, assuring trouble-free reverse transport of the document.

What is claimed is:

1. An apparatus for feeding an elongated document to an electrophotographic copier or the like comprising:

a pair of front and rear side plates mounted on the document table of the copier, a document guide portion made of a transparent material and pivotally supported at its one end by the side plates for receiving the document face up, first drive means for forcibly driving the document received in the guide portion, a document reversing guide disposed on one end of the document table and formed with a document passage for passing the document forcibly driven by the drive means, the document passage being curved to turn the document face down, second drive means disposed at a lower end outlet of the document passage to send out the document from the document passage face down along a document table glass, the drive means including second drive rollers to be driven at a higher circumferential speed than the first drive means in the same direction and second driven rollers rollingly engageable with the second drive rollers under the torque thereof due to gravity to nip the document, third drive means rollingly engageable with the document travelling on the document table glass under the torque thereof due to gravity and to be driven at a higher circumferential speed than the second drive rollers in the same direction, and fourth drive means disposed at the terminal end of the document table glass and including fourth drive rollers to be driven by way of a one-way clutch at a higher circumferential speed than the third drive means only in the normal direction and idly rotatable in the reverse direction and fourth driven rollers rollingly engageable with the fourth drive rollers under gravity to nip the document therebetween.

2. The apparatus as set forth in claim 1 wherein the first drive means includes a feed belt drive shaft extending between and supported by the side plates, a paper width adjusting shaft and feed belts reeved around the shafts, the feed belts being supported on the shafts position-adjustably in the axial direction of the shafts and formed on their surfaces with projections at equal spacing to the perforations of the document, the projections being engageable in the perforations to drive the document.

3. The apparatus as set forth in claim 1 further comprising:

a first microswitch having a driven member positioned at a suitable portion of the document passage to operate upon detection of the document, a second microswitch having a driven member positioned at the outlet of the fourth drive means to operate upon detection of the document, and an electromagnetic mechanism operable under the control of the first and second microswitches and normally supporting the second driven rollers and the third drive means at positions away from the second drive rollers and the document table glass with which they are rollingly engageable respectively, such that when the first microswitch detects the document the mechanism frees the second driven rollers and the third drive means from its support to bring the same into rolling engagement with the corresponding elements with which they are rollingly engageable and when the second microswitch detects the document the mechanism disengages the second driven rollers and the third drive means from the corresponding elements to support the same in position.

* * * * *

UNITED STATES PATENT OFFICE
CERTIFICATE OF CORRECTION

Patent No. 3,800,992      Dated  April 2, 1974

Inventor(s)  SEIICHI YAMAGISHI

It is certified that error appears in the above-identified patent and that said Letters Patent are hereby corrected as shown below:

--30  Foreign Application Priority Data

Japan      June 30, 1972................47-78020--

Signed and sealed this 6th day of August 1974.

(SEAL)
Attest:

McCOY M. GIBSON, JR.                C. MARSHALL DANN
Attesting Officer                   Commissioner of Patents